US006975597B1

(12) United States Patent
Baker et al.

(10) Patent No.: US 6,975,597 B1
(45) Date of Patent: Dec. 13, 2005

(54) AUTOMATED LINK VARIANT DETERMINATION AND PROTOCOL CONFIGURATION FOR CUSTOMER PREMISES EQUIPMENT AND OTHER NETWORK DEVICES

(75) Inventors: Albert D. Baker, Lincroft, NJ (US); Richard Kwokchiu Lau, Red Bank, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/503,042

(22) Filed: Feb. 11, 2000

(51) Int. Cl.[7] ............................................. H04L 12/28
(52) U.S. Cl. ..................................... 370/255; 370/469
(58) Field of Search ................................ 370/231, 252, 370/411, 466, 467, 469, 254, 255, 389, 392, 370/395.1, 397, 395.5, 395.52, 400, 409

(56) References Cited

U.S. PATENT DOCUMENTS

| 5,142,528 A | 8/1992 | Kobayashi et al. |
| 5,497,460 A * | 3/1996 | Bailey et al. ............... 370/258 |
| 5,574,722 A * | 11/1996 | Slykhouse et al. .......... 370/257 |
| 5,617,418 A | 4/1997 | Shirani et al. |
| 5,671,251 A | 9/1997 | Blackwell et al. |
| 5,751,796 A | 5/1998 | Scott et al. |

(Continued)

FOREIGN PATENT DOCUMENTS

| JP | 04120931 A | 4/1992 |
| JP | 11041317 A | 2/1999 |
| JP | 11234277 A | 8/1999 |
| WO | WO 97/29563 | 8/1997 |

OTHER PUBLICATIONS

J. Heinanen, "Multiprotocol Encapsulation over ATM Adaptation Layer 5," RFC 1483, http://www.ietf.org/rfc/rfc1483, 15 pages, Jul. 1993.

(Continued)

Primary Examiner—Chi Pham
Assistant Examiner—Anh-Vu H Ly
(74) Attorney, Agent, or Firm—Ryan, Mason & Lewis, LLP

(57) ABSTRACT

An autosensor or other communication system processing device determines which of a number of available link variants is required for a particular communication link that couples customer premises equipment (CPE) or another type of device to a network. The autosensor examines responses to messages sent over the link in order to determine one or more link variants associated therewith. The CPE or other device may then be automatically configured to support the determined link variant(s), e.g., by activation of an appropriate protocol entity in the CPE or other device. For example, CPE may be coupled to a network via an Asynchronous Transfer Mode (ATM) virtual circuit (VC) established over a digital subscriber line (DSL). In such an arrangement, multiple protocols may be encapsulated within the ATM cells, with each of the multiple protocols corresponding to a link variant. The CPE in this case may correspond to an ADSL termination unit-receive (ATU-R) device, or other type of gateway. The autosensor performs a series of tests to determine the link variant(s) for the VC, and the CPE or another network device which communicates with the CPE is then adjusted accordingly.

27 Claims, 4 Drawing Sheets

U.S. PATENT DOCUMENTS

| | | | |
|---|---|---|---|
| 6,094,437 A | * | 7/2000 | Loehndorf, Jr. et al. |
| 6,097,720 A | * | 8/2000 | Araujo et al. |
| 6,108,350 A | * | 8/2000 | Araujo et al. ............... 370/467 |
| 6,118,785 A | * | 9/2000 | Araujo et al. |
| 6,301,229 B1 | * | 10/2001 | Araujo et al. |
| 6,407,997 B1 | * | 6/2002 | DeNap et al. |
| 6,477,595 B1 | * | 11/2002 | Cohen et al. |
| 2003/0067884 A1 | * | 4/2003 | Abler et al. ............... 370/252 |

OTHER PUBLICATIONS

W. Simpson, Editor, "The Point-to-Point Protocol (PPP)," RFC 1661, http://www.ietf.org/rfc/rfc1661, 47 pages, Jul. 1994.

G. Gross et al., "PPP Over AAL5," RFC 2364, http://www.ietf.org/rfc/rfc2364, 11 pages, Jul. 1998.

* cited by examiner

AUTOMATED LINK VARIANT DETERMINATION AND PROTOCOL CONFIGURATION FOR CUSTOMER PREMISES EQUIPMENT AND OTHER NETWORK DEVICES

FIELD OF THE INVENTION

The present invention relates generally to communication networks, such as Internet Protocol (IP) networks including asynchronous transfer mode (ATM) connections or digital subscriber line (DSL) connections, and more particularly to customer premises equipment (CPE) or other devices that attach to such a network, e.g., CPE that attaches to the network via a DSL that transports Internet Protocol (IP) datagrams via ATM cells or other formats.

BACKGROUND OF THE INVENTION

Conventional IP communications service over ATM has been defined by the Internet Engineering Task Force (IETF) in several Request for Comments (RFCs) that describe different ways to encapsulate other protocols in ATM cells. One such RFC is RFC 1483 entitled "Multi-protocol encapsulation over ATM," which is incorporated by reference herein. Unfortunately, these different types of encapsulation have created a number of options for CPE that attaches to the IP network via a DSL. These options are also referred to herein as "link variants" or simply "variants." The term "IP communications" as used herein is intended to include any type of IP packets, including IP in an unencapsulated form, or encapsulated in Ethernet, point-to-point protocol (PPP), logical link control (LLC), etc.

Current applications of this technology generally require one of three possible approaches, each of which has significant disadvantages. In the first approach, the customer is required to know the particular variety of IP communications link that is available to them, and to manually configure the corresponding CPE to conform to that link type. For example, the customer may be required to set a particular link mode switch in the CPE. However, this approach is obviously problematic in that it requires a level of technical understanding and ability that customers often lack.

The second approach requires the customer to purchase CPE that is dedicated to a specific link variant. Although this avoids the need for the customer to make adjustments to the CPE, it can present substantial difficulties in situations in which the type of link may change, e.g., if the customer changes Internet Service Provider (ISP). It is clearly undesirable for the customer to be required to replace the CPE in such situations.

The third approach is to have a CPE vendor, or its agent, visit the customer site in person and perform a link configuration operation using conventional administrative techniques. This approach, although it can ensure an accurate configuration, is unduly complex and may be prohibitively expensive for the CPE vendor, network access provider and/or customer.

A need therefore exists for a technique which resolves the issue of link-type determination without the problems associated with the above-described conventional approaches.

SUMMARY OF THE INVENTION

The invention provides techniques for automated link variant determination and configuration of customer premises equipment (CPE) or other network devices. The invention solves the above-noted problems associated with conventional link variant determination and CPE configuration by providing an automated system that detects the link type, and then activates a protocol entity in the CPE or other network device that is appropriate to the detected link type. For example, the CPE or other network device may include a processing element that operates to implement selection of an appropriate interface or other protocol entity based on the link variant determination.

In accordance with the invention, an autosensor or other communication system processing device determines which of a number of available link variants is required for a particular communication link that couples the CPE or other device to a network. The autosensor examines responses to messages sent over the link in order to determine one or more link variants associated therewith. The CPE or other device is then automatically configured to support the determined link variant(s), e.g., by activation of an appropriate protocol entity in the CPE or other device.

In an illustrative embodiment of the invention, the CPE may be coupled to a network via an Asynchronous Transfer Mode (ATM) virtual circuit (VC) established over a digital subscriber line (DSL). In such an arrangement, multiple protocols may be encapsulated within the ATM cells, with each of the multiple protocols corresponding to a link variant. The CPE in this case may correspond to an ADSL termination unit-receive (ATU-R) device, or other type of gateway. The autosensor performs a series of tests to determine the link variant(s) for the VC, and the CPE is then adjusted accordingly.

The determined link type in the illustrative embodiment may include, e.g., one or more of a logical link control (LLC), a point-to-point protocol (PPP), an LLC-PPP, an Internet protocol (IP), an LLC-IP protocol, an Ethernet protocol, and an LLC-Ethernet protocol. A first test is applied to determine if the link is an LLC-type link. If the link is not an LLC-type link, at least one additional test of a first type is applied, e.g., a test to determine if the link is a PPP link. If the link is an LLC-type link, at least one additional test of a second type is applied, e.g., a test to determine a particular type of encapsulation for the LLC-type link.

Advantageously, the invention provides automated link variant determination and corresponding CPE configuration which avoids the problems associated with the above-described conventional approaches.

Although the above-described illustrative embodiment is particularly well suited for use in transmission applications involving external ATM transmitted over DSL network connections, the invention can also be implemented in other types of communication systems including, for example, Frame Relay systems, IP systems, or in conjunction with any other type of encapsulation technique. In addition, the invention can be used with other types of transport mechanisms and communication links.

Moreover, although illustrated in conjunction with CPE, the invention is applicable to other types of devices attached to or otherwise associated with a network communication link. For example, the invention may be implemented in a network server, so as to provide appropriate link variant determination and configuration to allow the server to communicate with another device over a particular fixed type of communication link.

These and other features and advantages of the present invention will become more apparent from the accompanying drawings and the following detailed description.

DETAILED DESCRIPTION OF THE INVENTION

The present invention will be illustrated below in conjunction with an exemplary communication system which provides connections between a local area network (LAN) and one or more external networks via a gateway. It should be understood, however, that the disclosed techniques are suitable for use with a wide variety of other types of systems including, for example, Frame Relay systems and IP systems, and with any desired type of communication medium, including asymmetric digital subscriber line (ADSL), synchronous optical network (Sonet)/synchronous digital hierarchy (SDH), wireless networks, etc. The term "local network" as used herein in intended to include any type of network which may be interfaced via a gateway device to one or more external network elements. A local network in accordance with the invention may therefore include, e.g., a LAN, wide area network (WAN), metropolitan area network (MAN), extranet, or intranet, as well as portions or combinations of these and other networks. The invention may be used with any desired type of transport mechanism, communication link, or set of protocol variants.

The present invention solves the above-described problems associated with configuration of customer premises equipment (CPE) or other network devices to support a particular one of a set of available link variants. An illustrative embodiment of the invention provides a system-driven process that detects the link type associated with the CPE, and then activates a protocol entity in the CPE that is appropriate to the link type. As will be described in greater detail below, this may be accomplished, e.g., by defining a message set for all link variant options, where each option is determined to have at least one message that, by specification requirement, demands a response.

In certain cases, such a response may require the return of data as an appropriate reply to a mandatory request for information. In other cases, there may be no such mandatory requests defined for the protocol, so other types of responses may be defined. For example, an error condition may be generated which mandates that a condition notification datagram be sent to the originator of the error condition. The invention in the illustrative embodiment thus issues a series of messages, and compares the resulting responses to the expected responses associated with each of the link variants. Advantageously, the CPE is thereby able to determine the correct link variant protocol and communicate successfully with the network without user or technician intervention. Moreover, the system will automatically reconfigure in the event of a network equipment upgrade, a change from a current Internet service provider (ISP) to one which supports different varieties of equipment, or in other similar situations.

Figure 1:
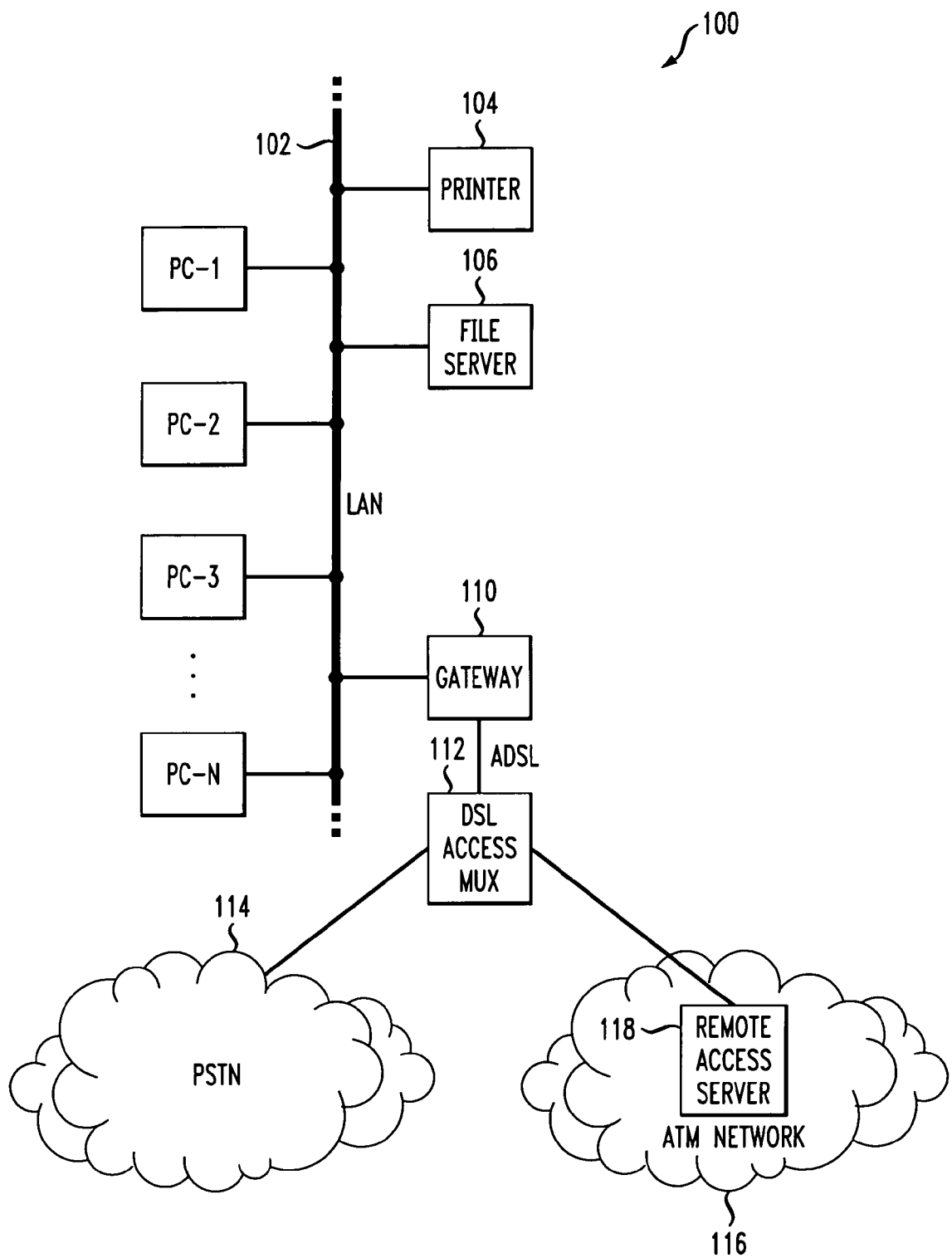
FIG. 1 is a block diagram of an exemplary communication system in which the invention may be implemented.

FIG. 1 shows a portion of a communication system 100 in accordance with an illustrative embodiment of the invention. The system 100 includes a LAN 102. Coupled to the LAN 102 are a plurality of personal computers designated PC-1, PC-2, PC-3, . . . PC-N, a printer 104 and a local file server 106. Also coupled to the LAN 102 is gateway 110, which may be, e.g., an ADSL termination unit-receive (ATU-R) device, as described in ANSI standard T1.413, which is incorporated by reference herein.

The gateway 110 and the devices coupled thereto are an example of CPE which may operate in accordance with an automated link variant determination process of the present invention. It should be understood, however, that the invention may be utilized in conjunction with many other types of CPE, as well as in other types of devices that may be coupled to a network. For purposes of the present description, a "device coupled to a network" is intended to include a device or set of devices that are also considered elements of the network itself.

The gateway 110 communicates via an ADSL link to a DSL access multiplexer (DSLAM) 112. The DSLAM 112 provides connections between the gateway 110 and a number of external networks, which in this illustrative embodiment include a public switched telephone network (PSTN) 114, and an asynchronous transfer mode (ATM) network 116 which includes a remote access server (RAS) 118. The RAS 118 may be, e.g., a broadband RAS.

Endpoints of the LAN 102 may be assigned Internet Protocol (IP) addresses by the RAS 118 in accordance with the well-known Dynamic Host Configuration Protocol (DHCP). DHCP dynamically allocates IP addresses to computers on a local network. For example, a range of IP addresses may be assigned to DHCP, such that each computer or other device on the local network can have its Transmission Control Protocol (TCP)/IP software configured to request an IP address from a remote DHCP server. As is known in the art, the request and grant process uses a lease concept with a controllable time period.

The conventional aspects of the operation of these and other devices in the system 100 of FIG. 1 are well understood in the art and therefore not described in detail herein. For example, additional details regarding the ATM communication aspects of the system 100 may be found in, e.g., ATM Forum, "ATM User-Network Interface Specification," Version 3.1, September, 1994, and in Martin de Prycker, "Asynchronous Transfer Mode: Solution for Broadband ISDN," Ellis Horwood, N.Y., 1993, both of which are incorporated by reference herein.

Figure 2:
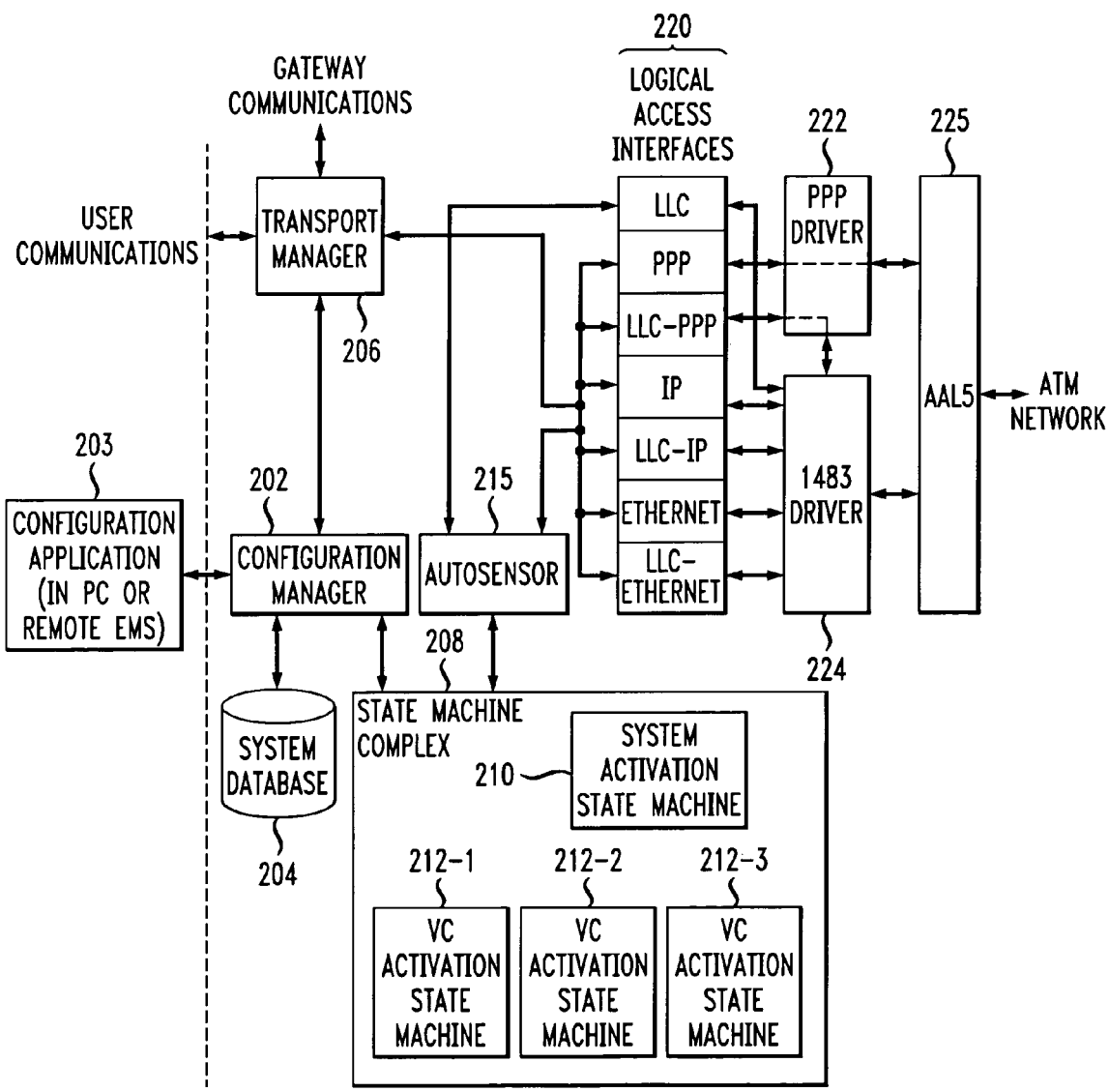
FIG. 2 is a more detailed block diagram showing a portion of the FIG. 1 communication system relating to automated link variant determination in accordance with the invention.

FIG. 2 shows a portion 200 of the system 100 in greater detail. The portion 200 may be implemented, e.g., primarily in the gateway 110, primarily in the DSLAM 112, partly in the gateway 110 and partly in the DSLAM 112, in the RAS 118, or in one or more other elements of the system 100. The link variant determination and protocol configuration techniques of the present invention are thus not restricted to use in CPE or in any other particular type of network device, and may be distributed across multiple devices. It may be assumed, for illustrative purposes, that the portion 200 is implemented primarily in an ATU-R device corresponding to the gateway 110.

The portion 200 includes a configuration manager 202 coupled to system database 204, a transport manager 206, and a state machine complex 208. The configuration manager 202 controls the operation of elements 204, 206 and 208, and interfaces with a configuration application 203 which may be implemented in a personal computer (PC) associated with a user of the CPE or other network device, or may be implemented in another device, such as a remote element management system (EMS), associated with the communication system 100. The configuration application 203 may be used, e.g., to provide an initial VPI/VCI (virtual path indicator/virtual channel indicator) for use by the CPE or other network device. The transport manager 206 controls both user communications and gateway communications as shown.

The state machine complex 208 includes a system activation state machine 210 and a number of virtual circuit (VC) activation state machines denoted 212-1, 212-2 and 212-3. An example of a system activation state machine is shown in greater detail in FIG. 4. An example of a VC activation state machine is shown in greater detail in FIG. 5. Although three VC activation state machines are shown in the state machine complex 208 of FIG. 2, this is by way of example only, and other embodiments may include more or less than three VC activation state machines.

The portion 200 of the system 100 further includes an autosensor 215 which controls selection of a particular one of a set of logical access interfaces 220. Each of the logical access interfaces corresponds to a particular link variant, and the autosensor 215 is configured to perform a sequence of tests to determine automatically which link variant is required for communication with a given piece of CPE. These tests will be described in greater detail below in conjunction with the state diagram of FIG. 3.

The set of logical access interfaces 220 includes a logical link control (LLC) interface, a point-to-point protocol (PPP) interface, an LLC-PPP interface, an Internet protocol (IP) interface, an LLC-IP interface, an Ethernet interface, and an LLC-Ethernet interface. As previously noted, each of these interfaces corresponds to a particular link variant. The PPP and LLC-PPP interfaces are coupled to a PPP driver 222. The LLC, IP, LLC-IP, Ethernet and LLC-Ethernet interfaces are coupled to a 1483 driver 224 which operates in accordance with the above-noted RFC 1483 entitled "Multiprotocol encapsulation over ATM." A particular one of the interfaces is activated or otherwise selected for use based on a result of the link variant determination to be described in greater detail below.

The above-noted link variants are well known in the art and will therefore not be described in detail herein. Additional information regarding LLC can be found in, e.g., ANSI/IEEE Standard 802.2 entitled "Logical Link Control," which is incorporated by reference herein. Additional information regarding PPP can be found in, e.g., RFC 1661 entitled "The Point-to-Point Protocol (PPP)" and RFC 2364 entitled "PPP Over AAL5," both of which are incorporated by reference herein. Additional information regarding Ethernet can be found in, e.g., ANSI/IEEE Standard 802.3 entitled "CSMA/CD Access Method and Physical Layer Specifications," which is incorporated by reference herein.

Both the PPP driver 222 and the 1483 driver 224 are coupled to an ATM Adaptation Layer 5 (AAL5) device 225 which provides an interface to an ATM network. The operation of AAL5 device 225 is described in greater detail in, e.g., International Telecommunication Union-Telecommunication Standardization Sector (ITU-T) Recommendation 1.363.5, Series I: Integrated Services Digital Network, Overall Network Aspects and Functions-Protocol Layer Requirements, B-ISDN ATM Adaptation Layer Specification, Type 5 AAL, August 1996, which is incorporated by reference herein.

Figure 3:
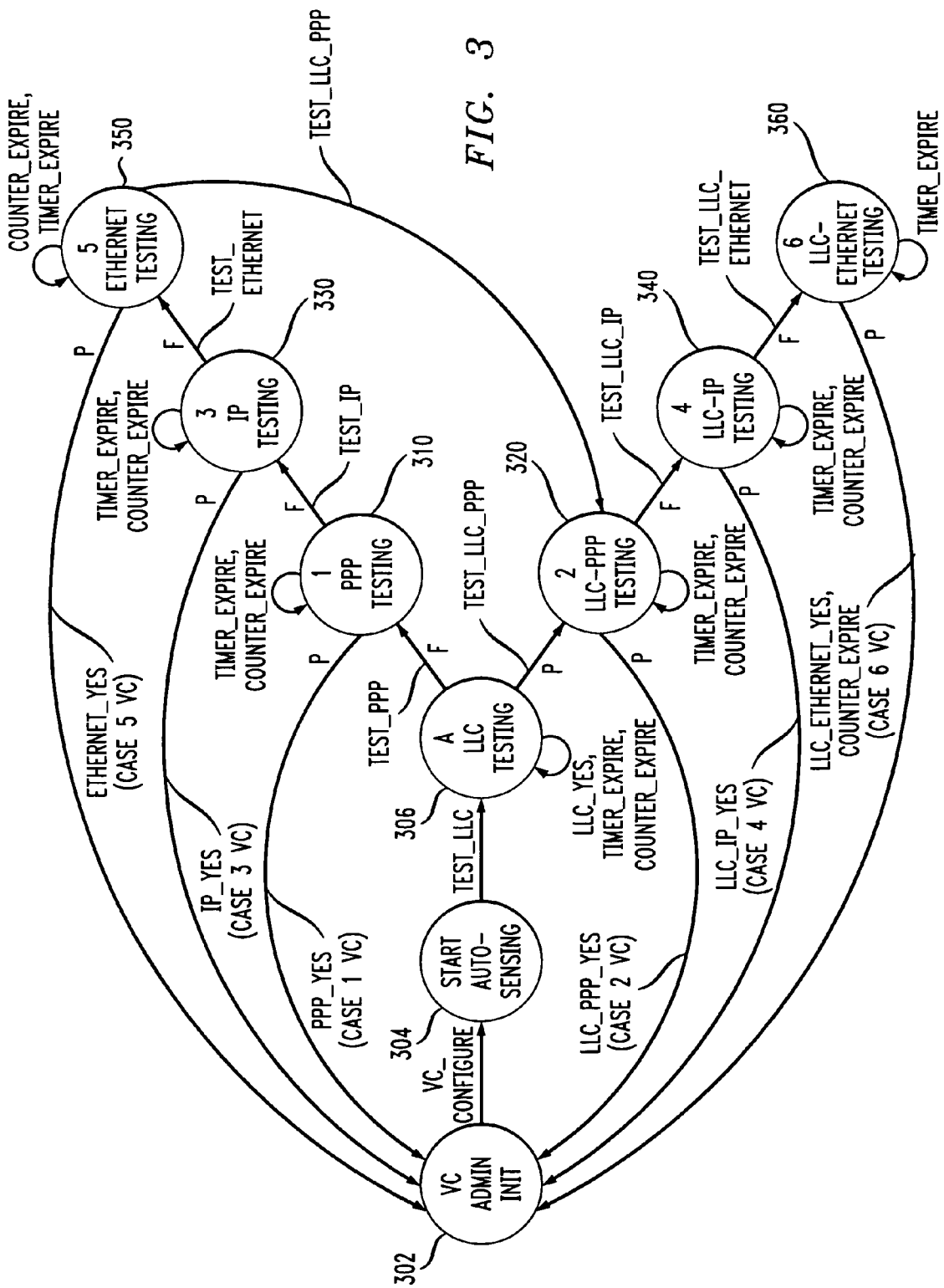
FIG. 3 is a state diagram of an automated variant determination process in accordance with an illustrative embodiment of the invention.

FIG. 3 is a state diagram of an automated variant determination process that is implemented in the autosensor 215 of FIG. 2 in accordance with the invention. In this embodiment, it is assumed that there are six different virtual circuit (VC) link variants, designated Case 1 through Case 6. These variants are summarized in the table below. The table shows, for each of the six cases, the name of the variant, and the corresponding type of protocol data unit (PDU) sent to or received from the AAL5 device 225. Each of the variants corresponds to one of the logical access interfaces in the set of interfaces 220 of FIG. 2. Of course, the invention does not require the use of these specific variants. A given set of variants used in conjunction with the invention may therefore include additional variants not shown, only a subset of the variants shown, or a completely different set of variants.

| Case | Link Variant Name | Protocol Data Unit (PDU) sent to/received from AAL5 |
| --- | --- | --- |
| 1 | PPP VC Multiplexed (Null Encapsulation) | PPP frame |
| 2 | PPP LLC Encapsulation | LLC header + Network Layer Protocol Identifier (NLPID) + PPP frame |
| 3 | IP VC Multiplexed (Null Encapsulation) | IP packet |
| 4 | IP LLC Encapsulation | LLC header + SubNetwork Address Portion (SNAP) header + PPP frame |
| 5 | Ethernet VC Multiplexed (Null Encapsulation) | Pad (0x00-00) + Media Access Control (MAC) destination address + remainder of Ethernet frame |
| 6 | Ethernet LLC Encapsulation | LLC header + SNAP header + Pad + MAC address + remainder of Ethernet frame |

The autosensing process as implemented in the state diagram of FIG. 3 determines for a given VC which of the above link variants, i.e., which of Cases 1 through 6, is applicable. The state diagram includes a VC Administration Initiation state 302, a Start Autosensing state 304, an LLC Testing state 306, a PPP testing state 310, an LLC-PPP Testing state 320, an IP Testing state 330, an LLC-IP Testing state 340, an Ethernet Testing state 350, and an LLC-Ethernet Testing state 360.

Associated with each of the states 306, 310, 320, 330, 340, 350 and 360 is a particular test, an identifier of which is shown in a given state diagram above the corresponding state name. More particularly, associated with states 306, 310, 320 330, 340, 350 and 360 are tests denoted Test A, Test 1, Test 2, Test 3, Test 4, Test 5 and Test 6, respectively. Each of these tests is described in greater detail below, and generally involves sending one or more designated messages, and examining subsequent received datagrams.

The transitions shown in the state diagram of FIG. 3 will now be described in greater detail. The state diagram indicates that the corresponding process starts in the VC Administration Initialization state 302. Generation of a VC_CONFIGURE indicator transitions the system to state 304 which starts the autosensing process. Generation of a TEST_LLC indicator transitions the system to state 306 for performance of Test A. If Test A fails, a TEST_PPP indicator is generated and the system transitions to state 310 to perform Test 1. If Test A passes, a TEST_LLC_PPP indicator is generated and the system transitions to state 320 to perform Test 2.

For each of Test A, Test 1, Test 2, Test 3 and Test 4, it is assumed the process remains in the corresponding state until either the test passes or the counter expires. If the counter expires without the test being passed, an indicator associated with performance of the next test in the sequence is generated prior to or in conjunction with a transition to the state which performs the next test. A COUNTER_EXPIRE indicator for each of states 306, 310, 320, 330 and 340 indicates that the process remains in the corresponding state until the next test indicator is generated and the transition to the next state occurs.

If Test 1 in state 310 passes, the VC is identified as a Case 1 VC, a PPP_YES indicator is generated, and the system returns to state 302. If Test 1 fails, a TEST_IP indicator is generated, and the system transitions to state 330 to perform Test 3. The system may remain in state 310 if a timer expiration indicator TIMER_EXPIRE or a counter expiration indicator COUNTER_EXPIRE is generated.

If Test 3 in state 330 passes, the VC is identified as a Case 3 VC, an IP_YES indicator is generated, and the system returns to state 302. If Test 3 fails, a TEST_ETHERNET indicator is generated, and the system transitions to state 350 to perform Test 5. The system may remain in state 330 if either of the TIMER_EXPIRE or COUNTER_EXPIRE indicators are generated.

If Test 5 in state 350 passes, the VC is identified as a Case 5 VC, an ETHERNET_YES indicator is generated, and the system returns to state 302. If Test 5 does not pass, the system transitions to state 320 upon generation of a TEST_LLC_PPP indicator. The system may remain in state 350 if either of the TIMER_EXPIRE or COUNTER_EXPIRE indicators are generated.

If Test 2 in state 320 passes, the VC is identified as a Case 2 VC, an LLC_PPP_YES indicator is generated, and the system returns to state 302. If Test 2 fails, a TEST_LLC_IP indicator is generated, and the system transitions to state 340 to perform Test 4. The system may remain in state 320 if either the TIMER_EXPIRE or COUNTER_EXPIRE indicators are generated.

If Test 4 in state 340 passes, the VC is identified as a Case 4 VC, an LLC_IP_YES indicator is generated, and the system returns to state 302. It should be understood that, in other embodiments, additional testing for further protocols could also be performed upon passage of Test 4. If Test 4 fails, a TEST_LLC_ETHERNET indicator is generated, and the system transitions to state 360 to perform Test 6. The system may remain in state 340 if either of the TIMER_EXPIRE or COUNTER_EXPIRE indicators are generated.

If Test 6 in state 360 passes, the VC is identified as a Case 6 VC, an LLC_ETHERNET_YES indicator is generated, and the system returns to state 302. If Test 6 does not pass, the system transitions to state 302 upon expiration of the counter, with the corresponding generation of a COUNTER_EXPIRE indicator.

The autosensing process corresponding to the state diagram of FIG. 3 will now be described in greater detail. The process in the illustrative embodiment includes the following steps:

Step 1. Check if the VC uses LLC encapsulation by performing Test A. If Test A is passed, then the VC uses LLC encapsulation, so go to Step 5. If Test A is failed, then the VC carries datagrams of a single protocol (e.g. IP packet, PPP frame, Ethernet frame), so go to Step 2.

Step 2. Check if the VC directly carries a PPP session by performing Test 1. If Test 1 is passed, then the VC is designated as a Case 1 VC, and the PPP operation shall continue. If Test 1 is failed, then the VC does not directly carry a single PPP session and go to Step 3.

Step 3. Check if the VC directly carries IP packets by performing Test 3. If Test 3 is passed, then the VC is designated as a Case 3 VC. If Test 3 fails, then the VC does not directly carry IP packets and go to Step 4.

Step 4. Check if the VC directly carries bridged Ethernet frames by performing Test 5. If Test 5 is passed, then the VC is designated as a Case 5 VC. If Test 5 fails, then the VC does not directly carry bridged Ethernet frames. Since all tests have failed to this point, the VC may be declared invalid.

Step 5. Check if the VC carries an LLC encapsulated PPP session by performing Test 2. If Test 2 is passed, then the VC is designated as a Case 2 VC, and the LLC encapsulated PPP operation shall continue. If Test 2 is failed, then the VC does not carry an LLC encapsulated PPP session and go to Step 6.

Step 6. Check if the VC carries LLC encapsulated IP packets by performing Test 4. If Test 4 is passed, then the VC is designated as a Case 4 VC. If Test 4 fails, then the VC does not carry LLC encapsulated IP packets. In either case, go to Step 7 because the VC may also carry LLC encapsulated Ethernet frames.

Step 7. Check if the VC carries LLC encapsulated Ethernet frames by performing Test 6. If Test 6 is passed before the expiration of the counter, then the VC is designated as a Case 6 VC. If Test 6 is not passed before the expiration of the counter, the VC is declared invalid, and the process moves to state 302.

Test A: Check if VC uses LLC encapsulation

Send an LLC TEST command PDU as follows and start timer/initialize counter:

| Field | Sub-Field | Value | No. of octets |
| --- | --- | --- | --- |
| LLC header | DSAP | 0x00 (NULL) | 1 |
|  | SSAP | 0x00 (NULL) | 1 |
|  | Control | 0xE3 (TEST) | 1 |
| Information | — | unique identifier | as required |

Note with regard to 0x00 (NULL), for destination service access point (DSAP), a least significant bit of "0" indicates that it is an individual DSAP (a "1" indicates a group address). For source service access point (SSAP), a least significant bit of "0" indicates a command LLC PDU (a "1" indicates a response LLC PDU).

Examine the octets in subsequent received datagrams. Test A is passed if the subsequent received datagrams include the following octets:

Octet 1 (DSAP)=0x00
Octet 2 (SSAP)=0x00 or 0x01
Octet 3 (Control)=0xE3
Octet 4+ (Information)=unique identifier from sent LLC Test A fails if no subsequent received datagrams meet the pass criteria within boundaries set by the timer and counter.

Test 1: Check if VC Multiplexed PPP

Send PPP LCP Configure-Request as follows and start timer/initialize counter:

| Field | Sub-Field | Value | No. of octets |
| --- | --- | --- | --- |
| PPP Protocol Identifier | — | 0xC0-21 (LCP) | 2 |
| PPP Information (LCP Packet here) | Code | 1 (Configure-Request) | 1 |
|  | Identifier | used for matching requests and replies | 1 |
|  | Length | length of LCP packet | 2 |
|  | Data | contains Configuration Options | 0 or more |

-continued

| Field | Sub-Field | Value | No. of octets |
|---|---|---|---|
| PPP Padding | — | padding out to MRU | as needed to pad out to MRU |

In the above table, LCP refers to Link Control Protocol, and MRU refers to Maximum Receive Unit.

Examine the first 4 octets in subsequent received datagrams. Test 1 is passed if the first 4 octets are as follows:

Octets 1–2 (PPP Protocol Identifier)=0xC021

Octet 3 (Code)=1, 2, or 3 (Configure-Ack, Configure-Nak, Configure-Reject, respectively)

Octet 4 (Identifier)=same value as in PPP LCP Configure-Request that was sent.

Test 1 fails if no subsequent received datagrams meet the pass criteria within the boundaries set by the timer and counter.

Test 2: Check if LLC Encapsulated PPP

Send LLC encapsulated PPP LCP Configure-Request as follows and start timer/initialize counter:

| Field | Sub-Field | Value | No. of octets |
|---|---|---|---|
| LLC header | DSAP | 0xFE (routed OSI PDU) | 1 |
|  | SSAP | 0xFE (routed OSI PDU) | 1 |
|  | Control | 0x03 (UI) | 1 |
| NLPID | — | 0xCF (PPP) | 1 |
| PPP Protocol Identifier | — | 0xC0-21 (LCP) | 2 |
| PPP Information (LCP Packet here) | Code | 1 (Configure-Request) | 1 |
|  | Identifier | used for matching requests and replies | 1 |
|  | Length | length of LCP packet | 2 |
|  | Data | contains Configuration Options | 0 or more |
| PPP Padding | — | padding out to MRU | as needed to pad out to MRU |

In the above table, OSI PDU refers to the Open Systems Interconnect Protocol Data Unit, and UI refers to Unnumbered Information.

Examine the first 8 octets in subsequent received datagrams. Test 2 is passed if the first 8 octets are as follows:

Octet 1 (DSAP)=0xFE

Octet 2 (SSAP)=0xFE

Octet 3 (Control)=0x03

Octet 4 (NLPID)=0xCF

Octet 5–6 (PPP Protocol Identifier)=0xC021

Octet 7 (Code)=1, 2, or 3 (Configure-Ack, Configure-Nak, Configure-Reject, respectively)

Octet 8 (Identifier)=same value as in LLC encapsulated PPP LCP Configure-Request that was sent.

Test 2 fails if no subsequent received datagrams meet the pass criteria within the boundaries set by the timer and counter.

Test 3: Check if VC Multiplexed IP

Send an ICMP Echo request as follows and start timer/initialize counter:

| Field | Sub-Field | Value | No. of octets |
|---|---|---|---|
| IP Packet Header | Version | 4 | 4 bits |
|  | Internet Header Length | 5 | 4 bits |
|  | Type of Service |  | 1 |
|  | Total Length | 20 + number of octets in ICMP packet | 2 |
|  | Identification |  | 2 |
|  | Flags |  | 3 bits |
|  | Fragment Offset |  | 13 bits |
|  | Time to live |  | 1 |
|  | Protocol | 1 (ICMP) | 1 |
|  | Header Checksum |  | 2 |
|  | Source IP address | all zeros or gateway IP address if it has one | 4 |
|  | Destination IP address | 224.0.0.2 (all-routers multicast address) or broadcast | 4 |
| IP Packet Payload (e.g., ICMP packet) | Type | 8 (Echo request) | 1 |
|  | Code |  |  |
|  | Checksum |  |  |
|  | Identifier |  |  |
|  | Sequence Number |  |  |
|  | Optional Data | may leave empty | 0 or more |

In the above table, ICMP refers to Internet Control Message Protocol. Examine the following octets in subsequent received datagrams. Test 3 is passed if the octets are as follows, and the identifier and sequence number match:

Octet 10 (Protocol)=1

Octets 13–16 (Source IP address)=valid (e.g. non-zero) IP address

Octets 16–20 (Destination IP address)=broadcast or gateway's IP address

Octet 21 (Type)=1 (Echo reply)

Test 3 fails if no subsequent received datagrams meet the pass criteria within the boundaries set by the timer and counter.

Test 4: Check if LLC Encapsulated IP

Send an LLC encapsulated ICMP echo as follows and start timer/initialize counter:

| Field | Sub-Field | Value | No. of octets |
|---|---|---|---|
| LLC header | DSAP | 0xAA (routed non-ISO PDU) | 1 |
|  | SSAP | 0xAA (routed non-ISO PDU) | 1 |
|  | Control | 0x03 (UI) | 1 |
| SNAP header | OUI | 0x00-00-00 (following PID is Ethertype) | 3 |
|  | PID | 0x08-00 (Internet IP PDU) | 2 |
| IP Packet Header | Version | 4 | 4 bits |
|  | Internet Header Length | 5 | 4 bits |
|  | Type of Service |  | 1 |
|  | Total Length | 20 + number of octets in ICMP packet | 2 |

-continued

| Field | Sub-Field | Value | No. of octets |
|---|---|---|---|
| | Identification | | 2 |
| | Flags | | 3 bits |
| | Fragment Offset | | 13 bits |
| | Time to live | | 1 |
| | Protocol | 1 (ICMP) | 1 |
| | Header Checksum | | 2 |
| | Source IP address | all zeros or gateway IP address if it has one | 4 |
| | Destination IP address | 224.0.0.2 (all-routers multicast address) or broadcast | 4 |
| IP Packet Payload (ICMP packet here) | Type | 8 (Echo request) | 1 |
| | Code | | |
| | Checksum | | |
| | Identifier | | |
| | Sequence Number | | |
| | Optional Data | may leave empty | 0 or more |

In the above table, PID refers to Protocol Identifier, and OUI is a sub-field of the SNAP header as defined in ANSI/IEEE Standard 802.2.

Examine the following octets in subsequent received datagrams. Test 4 is passed if the octets are as follows, and the identifier and sequence number match:

Octet 1 (DSAP)=0xAA
Octet 2 (SSAP)=0xAA
Octet 3 (Control)=0x03
Octets 4–6 (OUI)=0x00-00-00
Octets 7–8 (PID)=0x08-00
Octet 18 (Protocol)=1
Octets 21–24 (Source IP address)=valid (e.g. non-zero) IP address
Octets 25–28 (Destination IP address)=broadcast or gateway's IP address
Octet 29 (Type)=1 (Echo reply)

Test 4 fails if no subsequent received datagrams meet the pass criteria within boundaries set by the timer and counter.

Test 5: Check if VC Multiplexed Bridged Ethernet/802.3

| Field | Sub-Field | Value | No. of octets |
|---|---|---|---|
| PAD | — | 0x00-00 | 2 |
| MAC destination address | — | 48-bit broadcast MAC address | 6 |
| (remainder of MAC frame) | MAC source address | gateway's 48-bit MAC address | 6 |
| | Type (Ethernet)/ Length (802.3) | use length (802.3) | 2 |
| | LAN LLC DSAP | 0x00 (NULL) | 1 |
| | LAN LLC SSAP | 0x00 (NULL) | 1 |
| | LAN LLC Control | 0xE3 (TEST) | 1 |
| | Data | unique identifier | as required |
| LAN FCS (if preserved) | — | | 4 |

In the above table, FCS refers to Frame Check Sequence.

Examine the following octets in subsequent received datagrams. Test 5 is passed if the octets are as follows:

Octets 1–2 (PAD)=0x00-00
Octets 3–8 (MAC destination address)=gateway's 48-bit MAC address
Octets 9–14 (MAC source address)=non-zero 48-bit MAC address
Octet 17 (DSAP)=0x00
Octet 18 (SSAP)=0x00 or 0x01
Octet 19 (Control)=0xE3
Octet 20+ (Data)=same unique identifier as sent out Test 5 fails if no subsequent received datagrams meet the pass criteria within boundaries set by the timer and counter.

Test 6: Check if LLC Encapsulated Ethernet

| Field | Sub-Field | Value | No. of octets |
|---|---|---|---|
| LLC header | DSAP | 0xAA (routed non-ISO PDU) | 1 |
| | SSAP | 0xAA (routed non-ISO PDU) | 1 |
| | Control | 0x03 (UI) | 1 |
| SNAP header | OUI | 0x00-80-C2 (IEEE organization code indicates bridged PDU) | 3 |
| | PID | 0x00-01 (FCS preserved) or 0x00-07 (FCS not preserved) | 2 |
| PAD | — | 0x00-00 | 2 |
| MAC destination address | — | 48-bit broadcast MAC address | 6 |
| (remainder of MAC frame) | MAC source address | gateway's 48-bit MAC address | 6 |
| | Type (Ethernet)/ Length (802.3) | use length (802.3) | 2 |
| | LAN LLC DSAP | 0x00 (NULL) | 1 |
| | LAN LLC SSAP | 0x00 (NULL) | 1 |
| | LAN LLC Control | 0xE3 (TEST) | 1 |
| | Data | unique identifier | as required |
| LAN FCS | | only if PID = 0x00-01 | |

Examine the octets in subsequent received datagrams. Test 6 is passed if the octets are as follows:

Octet 1 (DSAP)=0xAA
Octet 2 (SSAP) 0xAA
Octet 3 (Control)=0x03
Octets 4–6 (OUI)=0x00-80-C2
Octets 7–8 (PID)=0x00-01 (FCS preserved) or 0x00-07 (FCS not preserved)
Octets 9–10 (PAD)=0x00-00
Octets 11–16 (MAC destination address)=gateway's 48-bit MAC address
Octets 17–22 (MAC source address)=non-zero 48-bit MAC address
Octet 25 (DSAP)=0x00
Octet 26 (SSAP)=0x01
Octet 27 (Control)=0xE3
Octet 28+ (Data)=same unique identifier as sent out Test 6 fails if no subsequent received datagrams meet the pass criteria within the boundaries set by the timer and counter.

Figure 4:
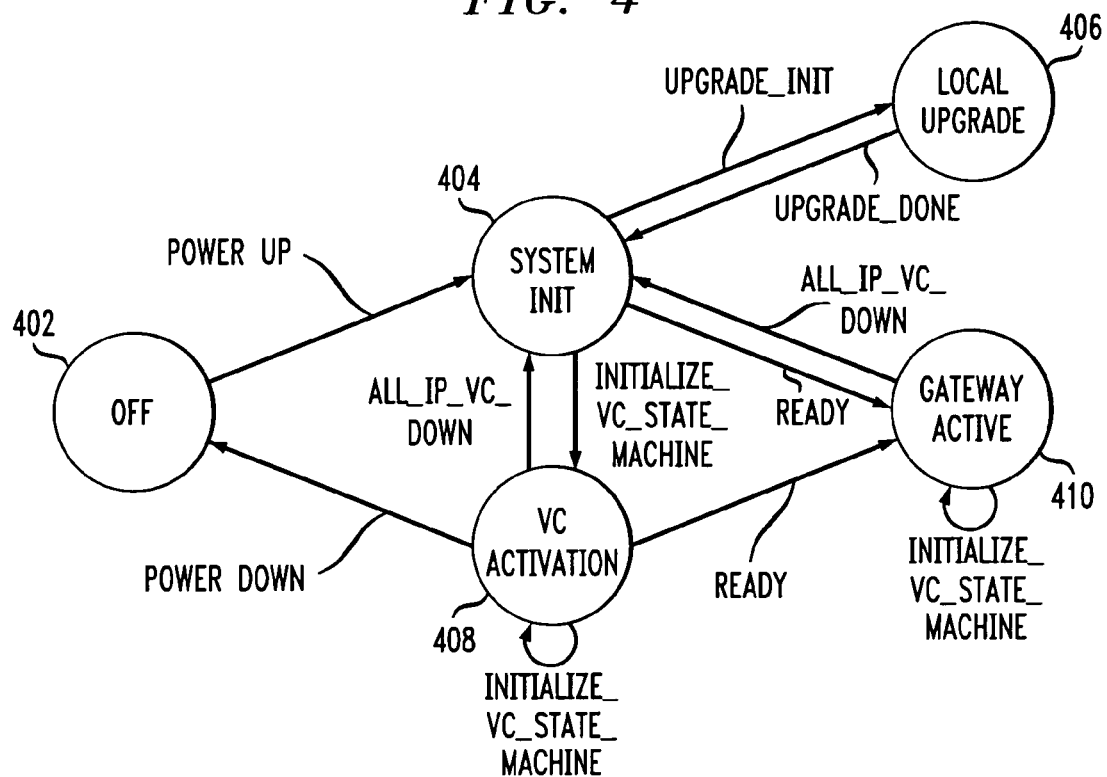
FIGS. 4 and 5 show examples of system activation and virtual circuit (VC) activation state machines in accordance with the invention.

FIG. 4 shows a state diagram for an exemplary system activation state machine 210 of FIG. 2. The state diagram includes an Off state 402, a System Initialization state 404, a Local Upgrade state 406, a VC Activation state 408, and a Gateway Active state 410. In the Off state 402, the system is not powered. At power up, the system transitions to state 404. From state 404, an upgrade may be initialized, resulting in transitions to or from state 406. The system from state 404 can transition directly to a VC Activation state 408. From state 408, VC state machines can be initialized, e.g., in accordance with a state diagram as will be described below in conjunction with FIG. 5.

The system from state 404 can also generate a READY indicator, which causes a transition to the Gateway Active state 410. From state 410, the system can initializes VC state machines, e.g., in accordance with the FIG. 5 state diagram. This initialization may involve one or more ATM VCs for which IP communications exist. As previously noted, the term "IP communications" as used herein is broadly defined as any type of IP packets, including IP in an unencapsulated form, or encapsulated in Ethernet, PPP, LLC, etc.

The system returns from states 408 or 410 to state 404 if an ALL_IP_VC_DOWN indicator is generated, indicating that there are no active VCs.

Figure 5:
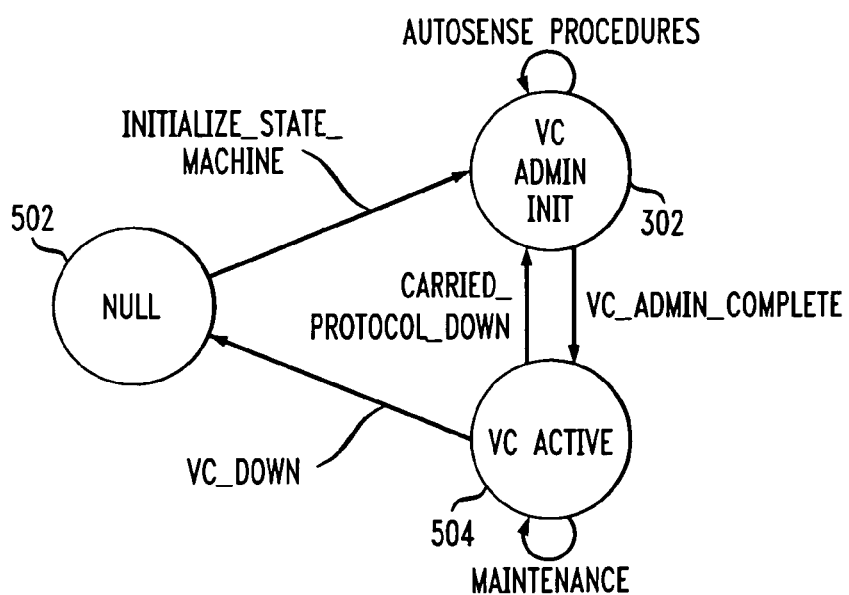

FIG. 5 shows a state diagram for an exemplary VC activation state machine 212-1, 212-2 or 212-3 of FIG. 2. The state diagram includes a Null state 502, a VC Active state 504, and the VC Administration Initiation state 302 previously described in conjunction with FIG. 3. From the Null state 502, generation of an INITIALIZE_STATE_MACHINE indicator coincides with a transition to the VC Administration Initialization state 302. In this state, the previously-described autosensing procedures are carried out in order to determine the particular link type required by the CPE. Once this process is complete, the system transitions to the VC Active state 504, and performs periodic maintenance procedures while in that state. Generation of a VC_DOWN indicator will cause a transition from state 504 back to the Null state 502. Also from state 504, generation of a CARRIED_PROTOCOL_DOWN indicator will cause a transition back to state 302.

Once the particular link variant or link variants associated with a given VC have been determined in the manner described above, the CPE or other network device can be configured to support the link variant(s), e.g., by activating appropriate protocol entities in the CPE or other network device. For example, a particular interface can be selected for the given VC from among a set of available link variant interfaces in the CPE or other network device, in accordance with the determined link variant for that VC.

The above-described state diagrams, process and tests are shown by way of example only. Those skilled in the art will recognize that the invention can be used with other configurations of state diagrams, processes and tests, as required for a particular autosensing application. For example, a different series of tests can be performed to identify other types of link variants supported by CPE among a set of available link variant options. As another example, one or more of the tests described may utilize other types of messages and/or response analysis to attempt to determine the particular link variant in a given application.

As previously noted, the present invention, although illustrated herein in conjunction with CPE, may also be implemented in other types of devices attached to or otherwise associated with a network communication link. For example, the invention may be implemented in a network server, so as to provide appropriate link variant determination and configuration to allow the server to communicate with another device over a particular type of communication link. In this case, the other device may be CPE having a fixed link variant requirement.

It will be recognized that many alternative configurations are possible for system 100, e.g., using elements other than those shown in FIGS. 1 and 2, and it should be understood that the invention is not restricted to use with any particular system configuration. The term "processing element" as used herein is intended to include any arrangement of one or more processors or other processing devices configured to provide autosensing and configuration functions in the manner described above, such as, e.g., an autosensor, a gateway, a RAS, a DSLAM, or one or more other elements of the system illustrated in FIGS. 1 and 2, as well as portions or combinations of such elements.

The invention can be implemented in whole or in part in software stored on a machine-readable medium, e.g., an optical or magnetic disk, a disk-based storage device, an electronic memory, etc., and executed by a processor associated with a gateway or other similar element or set of elements of a communication system.

The above-described embodiments of the invention are intended to be illustrative only. Numerous alternative embodiments within the scope of the following claims will be apparent to those skilled in the art.

What is claimed is:

1. A method for use in configuring a device coupled to a communications network, the communications network comprising a local network and one or more additional networks coupled to the local network, the method comprising the steps of:
    automatically determining a link type associated with a communication link between a first device and at least one additional device coupled to the communications network, the communication link being external to the local network and comprising a communication link of the one or more additional networks, by transmitting one or more messages from the first device and examining a corresponding response received by the first device over the communication link; and
    configuring at least one of the first and additional devices in accordance with the determined link type;
    wherein the first device comprises a gateway coupled between the local network and the one or more additional networks; and
    wherein the step of automatically determining a link type is implemented at least in part within the gateway.

2. The method of claim 1 wherein the first device comprises customer premises equipment.

3. The method of claim 1 wherein the first device comprises a network server.

4. The method of claim 1 wherein the determined link type is one of a plurality of link variants associated with the communications network.

5. The method of claim 2 wherein the customer premises equipment is coupled to the communication network via a digital subscriber line.

6. The method of claim 2 wherein the customer premises equipment comprises an ADSL (asymmetric digital subscriber line) termination unit-receive (ATU-R) device.

7. The method of claim 1 wherein the communication network comprises an Internet protocol (IP) network.

8. The method of claim 1 wherein the determined link type comprises one of a plurality of link variants at least a subset of which correspond to encapsulation of different types of protocols in Asynchronous Transfer Mode (ATM) cells.

9. The method of claim 1 wherein the communication link comprises an ATM virtual circuit (VC).

10. The method of claim 1 wherein the determined link type comprises one of a plurality of link variants including one or more of a logical link control (LLC), a point-to-point protocol (PPP), an LLC-PPP, an Internet protocol (IP), an LLC-IP protocol, an Ethernet protocol, and an LLC-Ethernet protocol.

11. A method for use in configuring a device coupled to a communications network the method comprising the steps of:
   automatically determining a link type associated with a communication link between a first device and at least one additional device coupled to the communications network by transmitting one or more messages from the first device and examining a corresponding response received by the first device over the communication link; and
   configuring at least one of the first and additional devices in accordance with the determined link type;
   wherein the determining step includes first testing to determine if the link is an LLC-type link, performing at least one additional test of a first type if the link is not an LLC-type link, and performing at least one additional test of a second type if the link is an LLC-type link.

12. The method of claim 11 wherein the at least one additional test of the first type includes a test to determine if the link is a PPP link.

13. The method of claim 11 wherein the at least one additional test of the second type includes a test to determine a particular type of encapsulation for the LLC-type link.

14. An apparatus for use in configuring a first device coupled to a communications network, the communications network comprising a local network and one or more additional networks coupled to the local network, the apparatus comprising:
   a processing element operative to automatically determine a link type associated with a communication link between the first device and at least one additional device coupled to the communications network, the communication link being external to the local network and comprising a communication link of the one or more additional networks, by transmitting one or more messages from the first device and examining a corresponding response received by the first device over the communication link; and to direct the configuration of at least one of the first and additional devices in accordance with the determined link type;
   wherein the first device comprises a gateway coupled between the local network and the one or more additional networks; and
   wherein the processing element operative to automatically determine a link type is implemented at least in part within the gateway.

15. The apparatus of claim 14 wherein the first device comprises customer premises equipment.

16. The apparatus of claim 14 wherein the first device comprises a network server.

17. The apparatus of claim 14 wherein the determined link type is one of a plurality of link variants associated with the communications network.

18. The apparatus of claim 15 wherein the customer premises equipment is coupled to the communication network via a digital subscriber line.

19. The apparatus of claim 15 wherein the customer premises equipment comprises an ADSL (asymmetric digital subscriber line) termination unit-receive (ATU-R) device.

20. The apparatus of claim 14 wherein the communication network comprises an Internet protocol (IP) network.

21. The apparatus of claim 14 wherein the determined link type comprises one of a plurality of link variants at least a subset of which correspond to encapsulation of different types of protocols in Asynchronous Transfer Mode (ATM) cells.

22. The apparatus of claim 14 wherein the communication link comprises an ATM virtual circuit (VC).

23. The apparatus of claim 14 wherein the determined link type comprises one of a plurality of link variants including one or more of a logical link control (LLC), a point-to-point protocol (PPP), an LLC-PPP, an Internet protocol (IP), an LLC-IP protocol, an Ethernet protocol, and an LLC-Ethernet protocol.

24. An apparatus for use in configuring a first device coupled to a communications network, the apparatus comprising:
   a processing element operative to automatically determine a link type associated with a communication link between the first device and at least one additional device coupled to the communications network, by transmitting one or more messages from the first device and examining a corresponding response received by the first device over the communication link; and to direct the configuration of at least one of the first and additional devices in accordance with the determined link type;
   wherein the processing element is operative to perform a test to determine if the link is an LLC-type link, to perform at least one additional test of a first type if the link is not an LLC-type link, and to perform at least one additional test of a second type if the link is an LLC-type link.

25. The apparatus of claim 24 wherein the at least one additional test of the first type includes a test to determine if the link is a PPP link.

26. The apparatus of claim 24 wherein the at least one additional test of the second type includes a test to determine a particular type of encapsulation for the LLC-type link.

27. A machine-readable medium storing one or more programs for use in configuring a device coupled to a communications network, the communications network comprising a local network and one or more additional networks coupled to the local network, wherein the one or more programs when executed by a processor implement the steps of:
   automatically determining a link type associated with a communication link between a first device coupled to the communications network and at least one additional device coupled to the communications network, the communication link being external to the local network and comprising a communication link of the one or more additional networks, by transmitting one or more messages from the first device and examining a corresponding response received by the first device over the communication link; and
   configuring at least one of the first and additional devices in accordance with the determined link type;
   wherein the first device comprises a gateway coupled between the local network and the one or more additional networks; and
   wherein the step of automatically determining a link type is implemented at least in part within the gateway.

* * * * *